US005113321A

United States Patent [19]

Suzuki

[11] Patent Number: 5,113,321

[45] Date of Patent: May 12, 1992

[54] VEHICULAR LAMP

[75] Inventor: Yoshinobu Suzuki, Shizuoka, Japan

[73] Assignee: Koito Manufacturing Co., Ltd., Tokyo, Japan

[21] Appl. No.: 582,032

[22] Filed: Sep. 13, 1990

[30] Foreign Application Priority Data

Sep. 13, 1989 [JP] Japan ................................ 1-235597

[51] Int. Cl.[5] ................................ B60Q 1/00

[52] U.S. Cl. ................................ 362/61; 362/299; 362/343; 362/346; 315/158

[58] Field of Search ................ 362/61, 80, 299, 304, 362/305, 268, 359, 327, 343, 346; 315/158

[56] References Cited

U.S. PATENT DOCUMENTS

| | | | |
|---|---|---|---|
| 1,194,758 | 8/1916 | McCarthy | 362/296 |
| 1,581,581 | 4/1926 | Lewis | 362/282 |
| 2,699,515 | 1/1955 | Williams | D26/71 |
| 4,383,290 | 5/1983 | Binder et al. | 362/80 |
| 4,459,644 | 7/1984 | Bailly | 362/80 |
| 4,677,532 | 6/1987 | Peitz et al. | 362/305 |
| 4,807,100 | 2/1989 | Hudimac, Jr. | 362/255 |
| 4,931,912 | 6/1990 | Kawakami et al. | 362/61 |
| 4,949,226 | 8/1990 | Makita et al. | 362/80 |
| 4,962,450 | 10/1990 | Reshetin | 362/299 |
| 5,010,458 | 4/1991 | Fraizer | 362/80 |

FOREIGN PATENT DOCUMENTS

| | | | |
|---|---|---|---|
| 0229572 | 7/1987 | European Pat. Off. | 362/351 |

*Primary Examiner*—Ira S. Lazarus
*Assistant Examiner*—D. M. Cox
*Attorney, Agent, or Firm*—Sughrue, Mion, Zinn, Macpeak & Seas

[57] ABSTRACT

A vehicular lamp which provided with a lamp body, an elliptic reflector accommodated in the lamp body, a light source positioned within a first focal area of the elliptic reflector, a projection lens positioned so that a focal point of which positions within a second focal area of the reflector, the light passing through the projection lens being substantially parallel, and an outer cover provided over the projection lens. An inner side of the lamp body is dark colored and the outer cover is made transparent.

11 Claims, 3 Drawing Sheets

VEHICULAR LAMP

BACKGROUND OF THE INVENTION

The present invention relates to a vehicular lamp, and more particularly to a vehicular lamp of a type which produces a parallel light beam from a light source using an elliptic reflector and a projection lens.

There are generally two types of the vehicular lamp producing parallel light beams. One lamp type employs a parabolic reflector and the other an elliptic reflector and a projection lens. The latter type is so-called a projection lamp. Projection lamps are advantageous in that they can be made smaller in size than the former type, as disclosed in U.S. Pat. Nos. 4,677,532, 2,338,901 and 1,581,581.

In a vehicular lamp of the former type, as shown in FIG. 3, a light absorbing treatment is often applied to an outer cover 1 for preventing inside of the lamp from appearing overly bright while the lamp is turned off. Similarly, a light absorbing treatment is also applied to the outer cover of the latter type in order not to show the inside of the lamp from the outside of the outer cover.

However, the light absorbing treatment increases manufacturing cost. Further, the light absorbing treatment reduces the light transmission of the outer cover substantially to 40-60%, thus requiring a larger bulb to maintain the same output light intensity.

SUMMARY OF THE INVENTION

In view of the foregoing difficulties accompanying the conventional lamps, it is an object of the present invention to provide a vehicular lamp requiring no light absorbing treatment and having good light transmission properties.

The above object can be accomplished by a provision of a vehicular lamp which, according to the present invention, is provided with a lamp body, an elliptic reflector accommodated in the lamp body, a light source positioned within a first focal area of the elliptic reflector, a projection lens positioned so that its focal point positions within the second focal area of the reflector, the light passing through the projection lens being substantially parallel, and an outer cover provided over the projection lens. The inner side of the lamp body is dark colored and the outer cover is made transparent.

Since the projection lamp is small in size and produces a relatively strong light intensity, the area of the reflector can be small. When sunlight while the lamp is turned off, for example, enters the projection lamp through the outer cover, most of the light is prevented from reemerging to the outside the lamp due to the characteristics of the elliptic reflector. Accordingly, the projection lens appears to be dark viewed from the outside of the lamp. Inside the lamp, except for the projection lens, also appears dark because the inner side of the lamp body is dark colored according to the invention. Therefore, without subjecting the outer cover to a light absorbing treatment, the lamp itself appears dark, thus obtaining a tranquil appearance. Since no light absorbing treatment is required, the light transmission rate of the outer cover is improved and a small bulb as a light source is sufficient.

DESCRIPTION OF THE PREFERRED EMBODIMENTS

Figure 1:
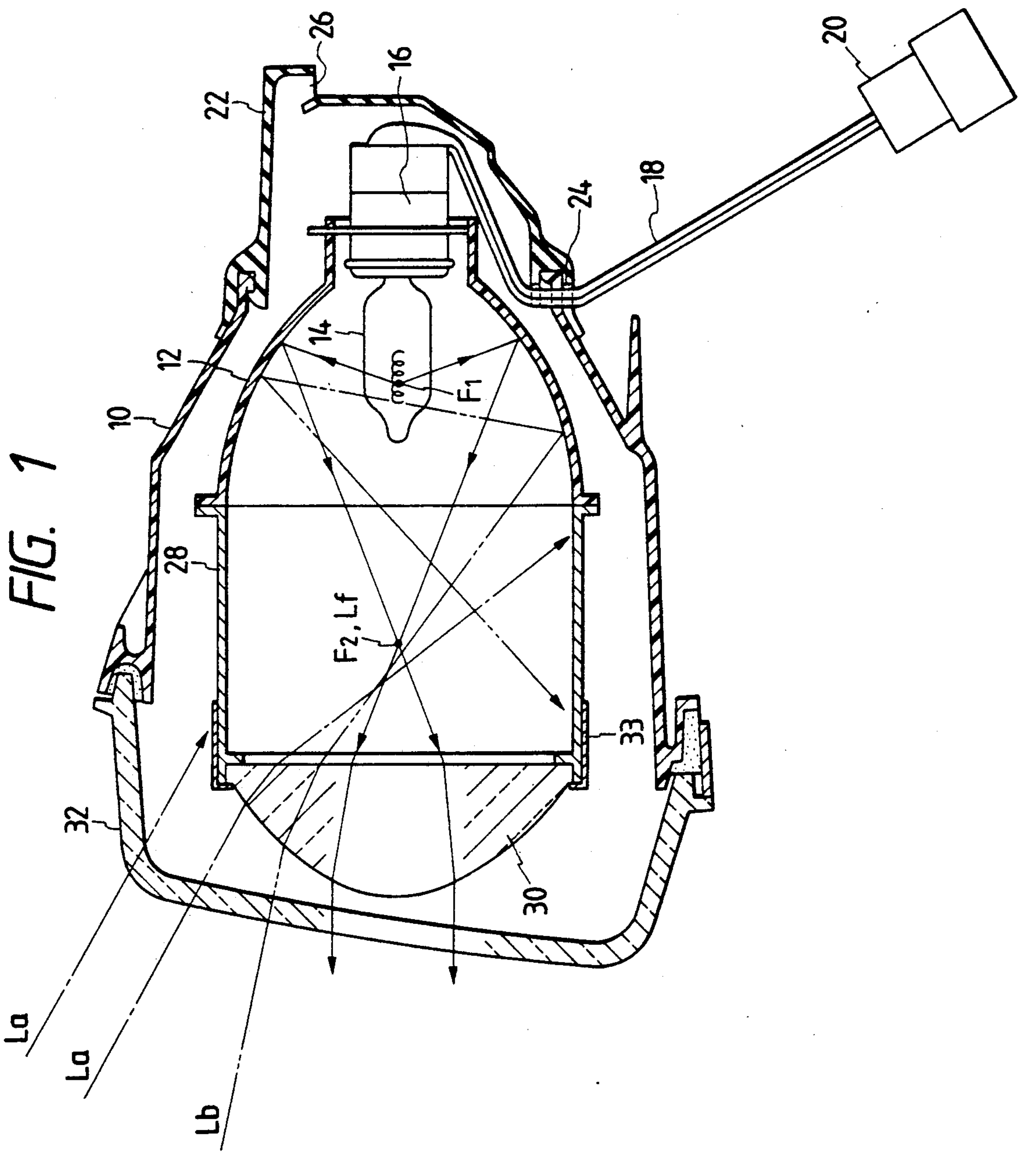
FIG. 1 is a sectional view showing a vehicular lamp according to the invention.

Preferred embodiments of the present invention will now be described with reference to accompanying FIGS. 1 and 2.

The vehicular lamp of the present invention is provided with a lamp body 10 formed of resin or the like and which accommodates therein an elliptic reflector 12 at the bulb side thereof. The inner surface of the reflector 12 is a reflective surface such as an Al deposition surface or the like. The filament of a bulb 14, which functions as the light source of the lamp, is positioned within a first focal area $F_1$ of the reflector 12. The bulb 14 may be selected from various types such as a D4 type, an $H_1$ or $H_2$ type halogen bulb according to the European Standard, or No. 9004 or 9005/6 type according to the United States Standard. The bulb 14 is connected to a wire 18 through a connector 16, and supplied with power from the vehicle's battery or alternator. A rear end opening of the lamp body 10 is covered by a cover 22 having an opening 24 through which the wire 18 is introduced into the body 10. The cover 22 also has an air hole 26 from which a heat generated by the bulb is discharged to the outside of the body 10.

Figure 4:
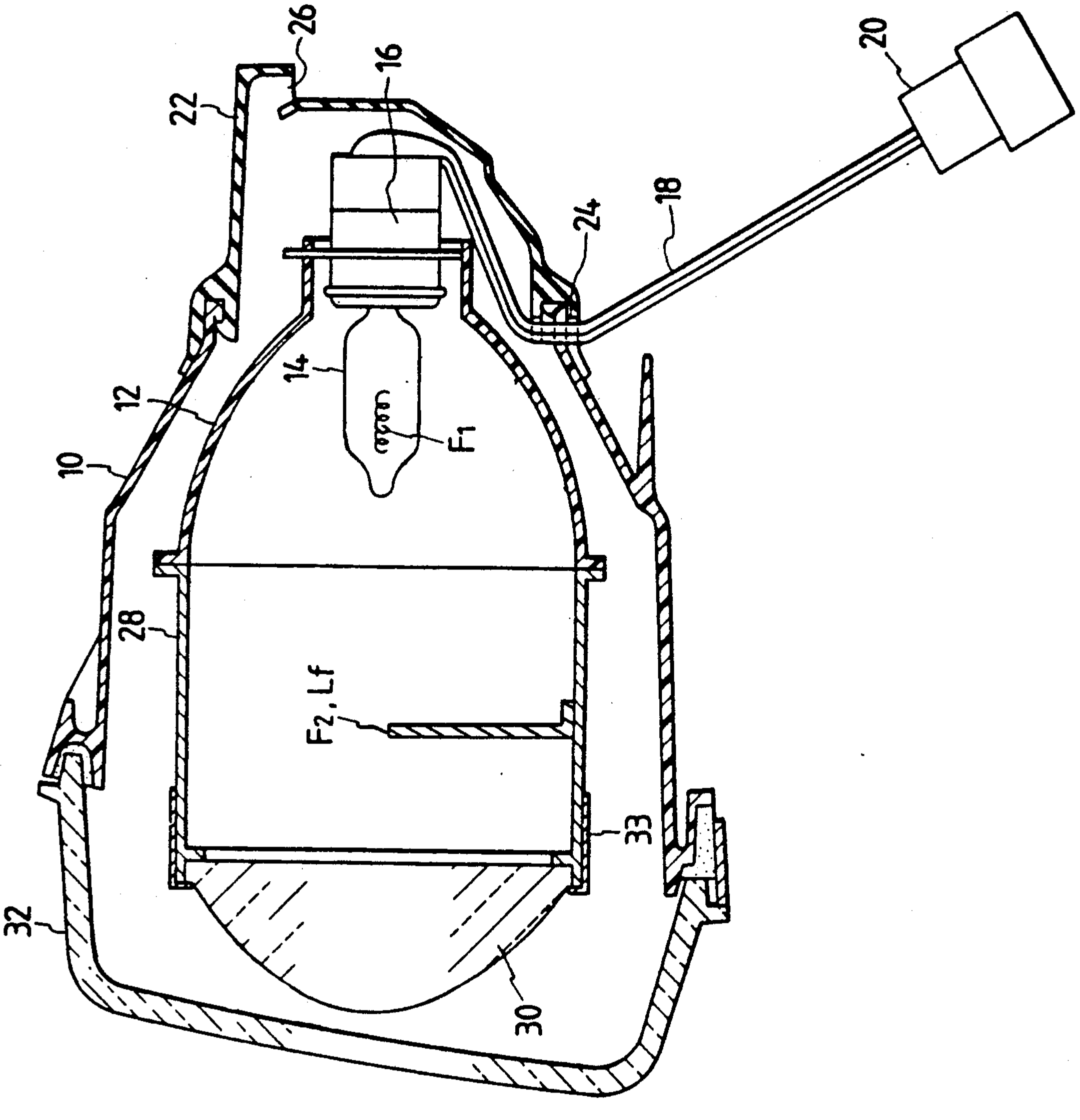
FIG. 4 is a sectional view showing a vehicular lamp of another embodiment of the invention.

A bracket 28 shielding the light produced by the bulb 14 is fixed to the reflector 12 along the front periphery thereof, and a projection lens 30 is joined to the bracket 28 at the front end thereof by a connecting member 33. Although FIG. 1 shows the bracket 28 as a separate member from the elliptic reflector 12, the reflector 12 and the bracket 28 may unitarily formed. The focal point Lf of the projection lens 30 is positioned within the second focal area $F_2$ of the reflector 12. As shown in FIG. 4 a shading member may 35 may be disposed, if necessary, in the reflector 12 at the focal point of the projection lens 30.

An outer cover 32 located over the front of the projection lens 30 is fitted to the lamp body 10 at the front opening thereof. The inner surface of the lamp body 10 and/or the outer peripheral surface of the bracket 28 is coated with a dark colored coating of a color such as black. According to another embodiment of the invention, those portions may be formed with a resin having a dark original color, thereby exhibiting the same effect without coating. Further, according to still another arrangement, the outer surface of the connecting member 33 may also be painted a dark color. Furthermore, only the inner surface of the lamp body 10 may be coated because most of area which can be seen from the outside of the outer cover 32 is the inner side of the lamp body 10. Substantially the same effect can be attained in this case.

Figure 2:
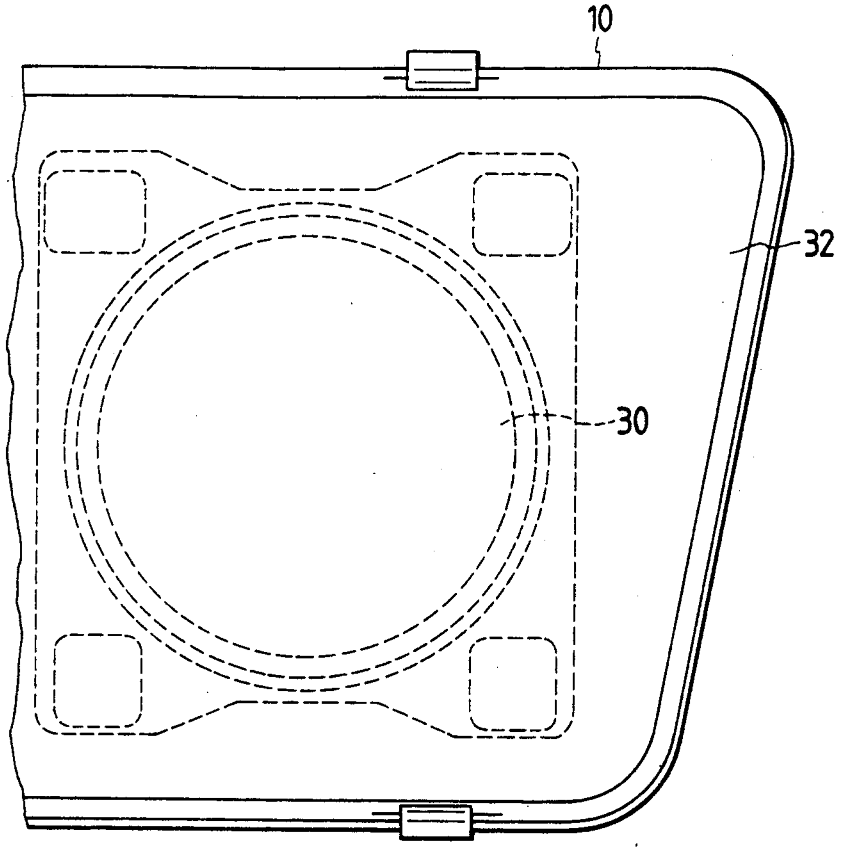
FIG. 2 is a front view of the vehicular lamp shown in FIG. 1.
Figure 3:
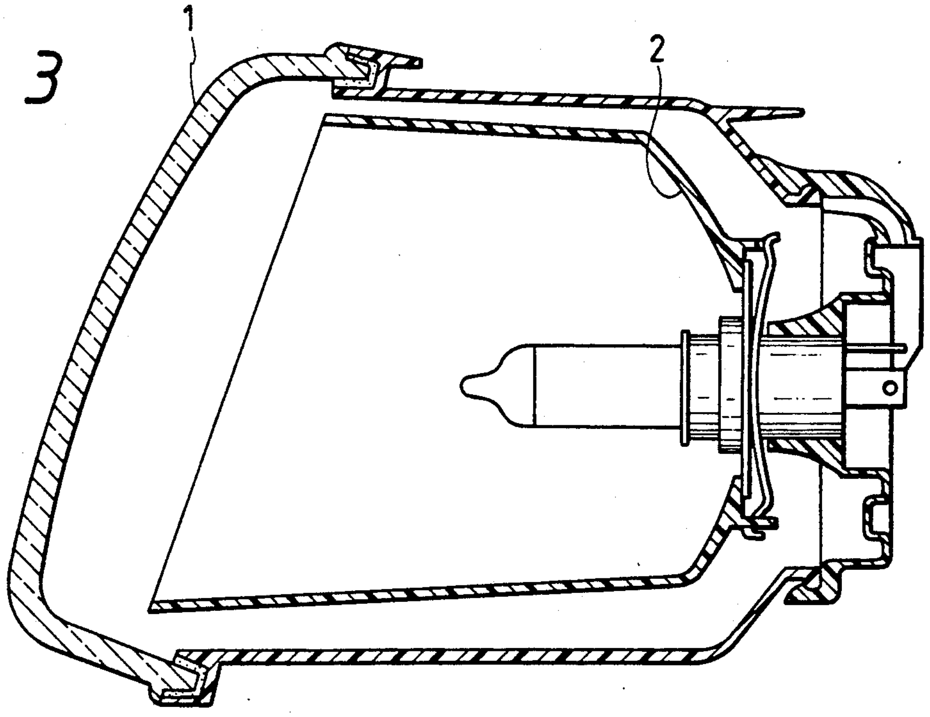
PRIOR ART FIG. 3
FIG. 3 is a sectional view showing a conventional lamp.

If, for example, sunlight enters the lamp body through the outer cover 32 and the projection lens 30 while the bulb 14 is not lit, the light will not reach to the reflective surface of the reflector 12 since it can only reach the outer surface of the bracket 28 or the inner surface of the bracket, being refracted largely by the projection lens 30 along an optical path La in FIG. 1. On the other hand, when the sun's rays enter at a low angle, such as when the sun is low in the sky in Lb, the sunlight reaches the elliptic reflector 12. However, due to the reflecting characteristics of the elliptic reflector 12, most of the light reaching the inner side of the reflector 12 is reflected vertically or laterally, and only a little light is reflected back to the outside of the lamp body through the projection lens 30. For this reason, the projection lens 30 appears to be dark viewed from outside the outer cover 32.

Light reaching between the outer periphery of the projection lens 30 and the area between the inner periphery of the lamp body 10, along the optical path La, for example, is largely absorbed by the dark colored outer surface of the bracket 28 and/or by the inner surface of the lamp body 10. Accordingly, the space inside the outer cover 32 other than the projection lens 30 also appears to be dark viewed from the outer cover 32.

As a result, the inner side of the outer cover 32 appears to be dark as a whole so that the lamp overall achieves a tranquil appearance, thus enhancing the value of the automobile. With the invention, no light absorbing treatment for preventing the inside of the lamp from being disadvantageously appearing bright from the outside is required. Further, since the outer cover is not subjected to a light absorbing treatment, the light transmission rate of the light passing through the clear and transparent outer cover is improved. Therefore, the same light intensity projecting through the outer lens 32 can be obtained using a smaller bulb than the conventional lamp employing an outer cover to which a light absorbing treatment is applied. Furthermore, the requirements for the heat-resistance treatment for the cover are not so strict compared to the conventional lamp since the light transmission rate is good.

The elliptic reflector 12 may be a composite reflector having an elliptical shape in vertical section and a parabolic shape in horizontal section, or a multiple ellipse.

As described above, the present invention has been made in consideration of characteristics of a projection-type headlamp in which light produced by the light source is formed into a substantially parallel beam using an elliptic reflector and a projection lens. With the invention, the projection lens is dark viewed from outside the outer cover. Since the inner surface of a lamp body is dark colored or black colored, the lamp appears to be dark. Therefore, the lamp itself exhibits a tranquil appearance such as to increase the value of the automobile. The light absorbing treatment is no longer required. Further, the transmission rate of the light is improved and, therefore, the same light intensity can be obtained with a smaller bulb than with a conventional lamp employing an outer cover to which the light absorbing properties is applied, so that the lamp can be made small in size and requires little power.

What is claimed is:

1. A vehicular lamp comprising:

a lamp body;

an elliptic reflector accommodated in said lamp body, said elliptic reflector having a first and a second focal areas;

a light source provided within said first focal area of said elliptic reflector;

a bracket fixed to said elliptic reflector;

a projection lens mounted on said bracket, said projection lens having a focal point positioned within said second focal area of said elliptic reflector, said projection lens producing substantially parallel light; and a substantially transparent outer cover provided over said projection lens, and attached at a peripheral edge portion thereof to a forward open end of said lamp body, a gap being formed between a forward edge of said bracket and said outer cover and said lamp body through which a substantial portion of an outer surface of said bracket and an inner surface of said lamp body is visible through said outer cover, wherein at least one of said inner surface of said lamp body and said outer surface of said bracket is dark colored, whereby said lamp has a dark appearance when said light source is off.

2. The vehicular lamp according to claim 1, further comprising means for connecting said bracket and said projection lens.

3. The vehicular lamp according to claim 2, wherein an outer surface of said connecting means is dark colored.

4. The vehicular lamp according to claim 1, wherein said elliptic reflector and said bracket are unitarily formed.

5. The vehicular lamp according to claim 1, further comprising a shading member provided at said focal point of said projection lens.

6. The vehicular lamp according to claim 1, wherein said lamp body is provided with an air hole.

7. The vehicular lamp according to claim 1, wherein said lamp body and said bracket are formed of dark colored resin.

8. The vehicular lamp according to claim 1, wherein said dark color is black.

9. The vehicular lamp according to claim 1, wherein said elliptic reflector is a composite reflector having an elliptical shape in vertical section and a parabolic shape in horizontal section.

10. The vehicular lamp according to claim 1, wherein said elliptic reflector is a multiple ellipse.

11. The vehicular lamp according to claim 1, wherein said light source is a halogen bulb.

* * * * *